(12) United States Patent
Sodeyama et al.

(10) Patent No.: US 7,969,667 B2
(45) Date of Patent: Jun. 28, 2011

(54) LENS ASSEMBLY

(75) Inventors: Toshiya Sodeyama, Ina (JP); Yasutaka Tanabe, Ina (JP); Hideaki Ichikawa, Nagano (JP)

(73) Assignee: Olympus Imaging Corp., Tokyo (JP)

( * ) Notice: Subject to any disclaimer, the term of this patent is extended or adjusted under 35 U.S.C. 154(b) by 12 days.

(21) Appl. No.: 12/462,064

(22) Filed: Jul. 28, 2009

(65) Prior Publication Data

US 2010/0027135 A1 Feb. 4, 2010

(30) Foreign Application Priority Data

Jul. 30, 2008 (JP) .................. 2008-196629
Feb. 26, 2009 (JP) .................. 2009-043286
Feb. 27, 2009 (JP) .................. 2009-045180

(51) Int. Cl.
G02B 7/02 (2006.01)
G02B 9/00 (2006.01)

(52) U.S. Cl. ......... 359/819; 359/811; 359/818; 359/740

(58) Field of Classification Search .................. 359/740, 359/811, 818, 819, 821, 830
See application file for complete search history.

(56) References Cited

FOREIGN PATENT DOCUMENTS

| JP | 7-1071 | 1/1995 |
|---|---|---|
| JP | 07-010710 | 2/1995 |
| JP | 2007-065017 | 3/2007 |
| JP | 2007-121612 | 5/2007 |

*Primary Examiner* — Jack Dinh
(74) *Attorney, Agent, or Firm* — Kenyon & Kenyon LLP

(57) ABSTRACT

A lens assembly comprises a lens group M and a lens frame 1 for retaining the lens group M. In this lens assembly, the lens frame 1 has an entire circumference support 2b for supporting the rim on the subject side, of each lens M, across the entire circumference thereof, and an end face support 2a for supporting the lens M on the image side. Each lens M comprises a chamfer 3b formed at a rim of a lens surface on the subject side across the entire circumference thereof, and the entire circumference support 2b supports the chamfer 3b such that the entire circumference support 2b is continuous with the lens surface at substantially the same radius of curvature with the lens surface. According to the present invention, there is provided a lens assembly which can reduce size and cost and has stable lens retaining ability.

14 Claims, 8 Drawing Sheets

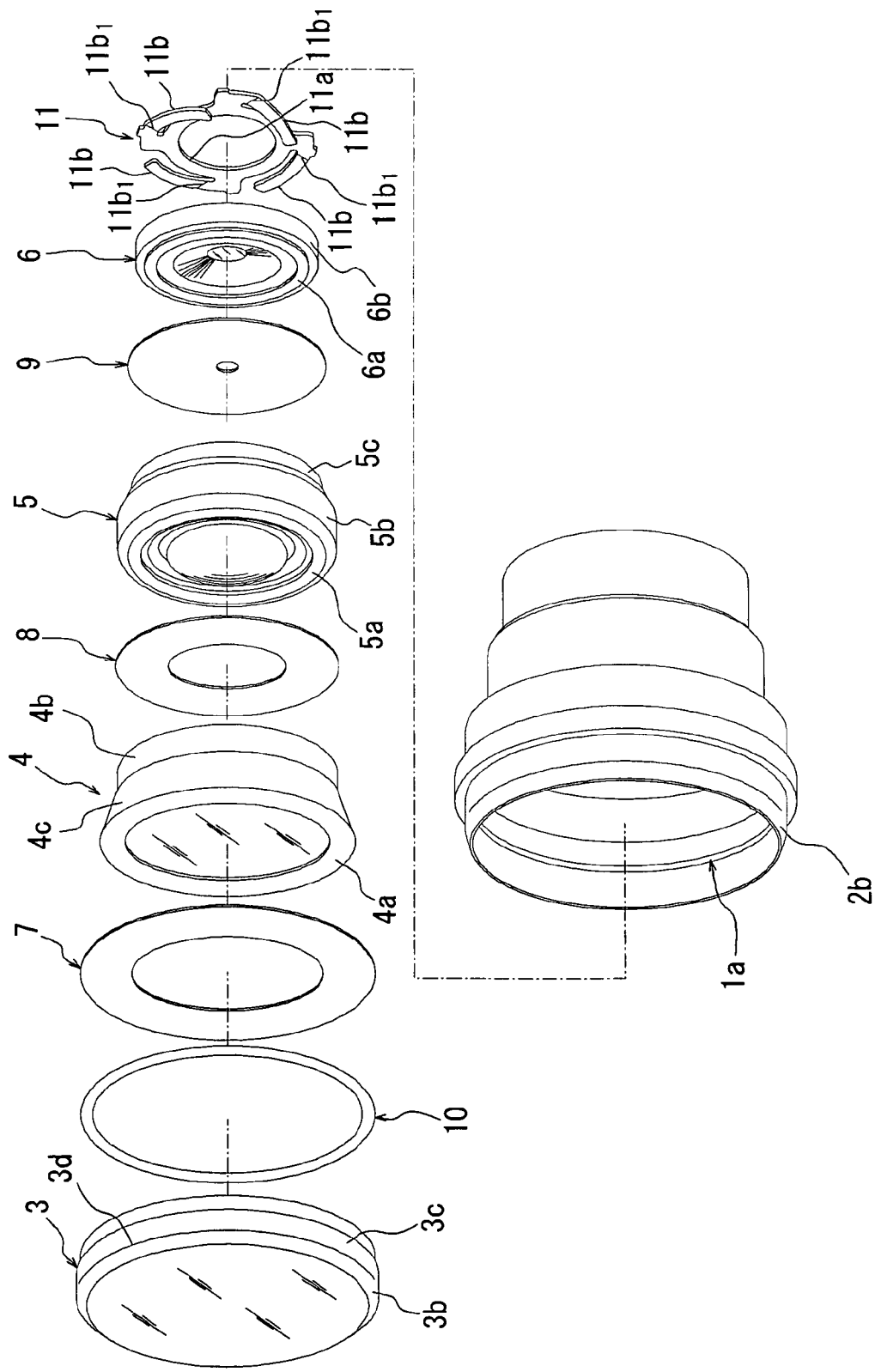

LENS ASSEMBLY

CROSS-REFERENCE TO APPLICATIONS

The present application claims the priorities of Japanese Patent Application No. 2008-196629 filed on Jul. 30, 2008, Japanese Patent Application No. 2009-043286 filed on Feb. 26, 2009, and Japanese Patent Application No. 2009-045180 filed on Feb. 27, 2009, which are herein incorporated in their entirety for reference.

FIELD OF THE INVENTION

The present invention relates to a lens assembly adopted as a component of an on-board camera for back, right, and left views, and a monitoring camera, and the like, and simplifies the structure of the lens assembly for realizing an effective and accurate assembly of the lens assembly.

BACKGROUND OF THE INVENTION

A known structure for a conventional lens assembly comprises a receiving part formed on a lens frame, for positioning the lens along the optical axis, and a plurality of locking parts having elasticity and extending along the optical axis, formed at a plurality of places (e.g. three sites) of a wall surrounding the outer periphery of the lens supported by the receiving part, wherein the lens is held to be supported elastically between the locking part and the receiving part (see, for example, JP 2007-65017A). Similar structure is also known, in which a plurality of lenses stacked each other and retained elastically interposed between a receiving part and a plurality of locking parts formed on the lens frame (see, for example, JP 2007-121612A).

A fish-eye lens (wide-angle lens), having an imaging angle over 120 degrees, is commonly used for an on-board camera so as to acquire images of a wide range. This type of lens is commonly applied to a lens assembly having a plurality of lenses, adapted to a lens frame having apertures open to both its subject side and image side and disposed in serial along the optical axis (see, for example, JP7-10710U).

As such lens assembly, for example, a known structure comprises a receiving part formed at one end of a lens frame, for positioning the lens along the optical axis, wherein a plurality of lenses are inserted onto the receiving part to be stacked sequentially from the smallest to the largest according to respective diameters, such that the surface edge of the topmost lens is locked by a locking part formed on the other edge of the lens frame (see, for example, JP 2007-121612A).

However, both conventional lens assemblies described in JP 2007-65017A and JP 2007-121612A provide flanges on the lens which the locking parts of the lens frame is to abut with, so that the locking parts contact these flanges. To this end, the lens diameter including the flanges increases and the outer diameter of the lens frame is increased accordingly, thereby possibly increasing the whole size of the lens assembly, as well. Moreover, since flanges are formed on the lens, complicated lens processing is necessitated and thus the cost will grow.

Three locking parts are formed on the lens frame, for example, whereby it is difficult to gain sufficient support strength. For this reason, the lens may be displaced within the lens frame by an external impact, and as a result, for example, the imaging optical axis may shift in a case of an imaging lens, while the projection optical axis may shift in case a projection lens, whereby desired images may not be acquired in either case.

The conventional lens assembly as in JP 7-10710 U may not be assembled efficiently and accurately because the lens assembly has a large number of parts and the structure thereof is inevitably complicated.

Moreover, in the lens assembly disclosed in JP 2007-121612A, mentioned above, the circumferential surface of each lens is formed in parallel with the optical axis (in the thickness direction). That is, the circumferential surface of each lens is formed to have equi-diameter in the thickness direction. The inner circumference of the lens frame is also formed stepwise in the optical axis, so as to correspond with the diameter and the circumferential shape of each lens.

As a result, when inserting each lens to the lens frame, the lens may fall over or inserted with its optical axis being tilt with respect to the predefined optical axis set for the lens frame because the outer peripheral surface of the lens may be caught by the inner peripheral surface of the lens frame having a corresponding inner diameter thereto, and therefore, it is difficult to insert the lens in the predefined posture. Especially, when inserting plurality of lenses to the lens frame such that these lenses stack each other, if the lens inserted prior to the other lens is tilted to the predefined optical axis, the next lens will also be inserted with a tilt, and thus the optical performance will be deteriorated.

The lens frame has an inner circumferential surface stepwisely formed along the optical axis in accordance with the diameter and shape of circumferential surface of each lens. Therefore, in a case where a predetermined thickness corresponding to such a stepwise inner circumferential shape is ensured for the lens frame, the portions having large external diameters increase, whereby the whole dimension of the lens assembly may become larger.

BRIEF SUMMARY OF THE INVENTION

The object of the present invention is to provide a lens assembly having small size in which assembling property can be improved and the desired optical characteristics can be easily obtained.

Another object of the present invention is to provide a lens assembly with a simple structure which allows accurate and effective assembly.

The first aspect of the lens assembly according to the present invention for achieving above objects is characterized that: the lens frame comprises an entire circumference support for supporting a lens rim on the subject side across the entire circumference thereof, and an end face support for supporting the image side of the lenses; each of the lenses having a chamfer formed across the entire circumference of the lens rim on the subject side; and the entire circumference support supports the chamfer such that the entire circumference support is continuous with the lens surface at substantially the same radius of curvature as the lens surface.

In the second aspect of the present invention, the lens assembly as in the first aspect is characterized in that the chamfer is formed by rounding a side corner of an outer circumferential surface.

In the third aspect of the present invention, the lens assembly as in the first aspect is characterized in that the lenses comprise four lenses retained to be stacked with each other between the end face support and the entire circumference support, and, provided that those four lenses are disposed as a first lens, a second lens, a third lens, and a fourth lens from the entire circumference support side to the end face support side, the first lens is made of glass and the second, the third, and the fourth lenses are made of plastics, respectively, and a chamfer is formed on a lens face on the opposite side of the end face support, of the first lens, and an aperture diaphragm is formed between the third and the fourth lenses.

In the fourth aspect of the present invention, the lens assembly as in the third aspect is characterized in that: the first lens has a recess formed across the entire circumference of the end face edge portion on the end face support side; the inner periphery of the lens frame has an inner peripheral wall surface, which is opposite to the recess; a sealing member is arranged between the recess and the inner peripheral wall surface; flare diaphragms are arranged between the first and the second lenses, and between the second and the third lenses, respectively; and an elastic member is arranged between the fourth lens and the end face support for elastically pushing the fourth lens toward the first lens.

In the fifth aspect of the present invention, the lens assembly as in the first aspect is characterized in that: the lenses comprise a plurality of lenses arranged in an order along the optical axis in the lens frame; the end face support is formed on the end face of the aperture on the image side of the lens frame, as a diaphragm wall, which is attached to the end face integrally for exposing only an optically functioning portion of a lens positioned on the image side; and an elastic member is arranged between the end face support and the lens on the image side, for positioning the end faces of the lenses by means of making these end faces elastically contact each other by using a pressure along the optical axis of the lens, which lens is fixed on the aperture on the subject side.

In the sixth aspect of the present invention, the lens assembly as in the fifth aspect is characterized in that the lenses comprise at least three lenses which have diaphragms between end faces thereof.

In the seventh aspect of the present invention, the lens assembly as in the fifth aspect is characterized in that the entire circumference support fixes a lens placed at the aperture on the subject side by means of caulking made by heat or mechanical deformation of the lens frame.

In the eighth aspect of the present invention, the lens assembly as in the fifth aspect is characterized in that the lens, which is arranged at the aperture on the subject side, is clamped between the end face of the lens and a step inside the lens frame, and the lens assembly further comprising a sealing members for keeping a space between the end face of the lens and a step inside the lens frame gas-tight.

In the ninth aspect of the present invention, the lens assembly as in the fifth aspect is characterized in that the lens arranged at the aperture on the subject side is a lens made of glass, and other lenses including the lens on the image side are lenses made of plastics.

In the tenth aspect of the present invention, the lens assembly as in the fifth aspect is characterized in that the lens frame comprises inner peripheral wall surface for arranging lenses having progressively smaller diameters toward the end face support.

In the eleventh aspect of the present invention, the lens assembly as in the fifth aspect is characterized in that the elastic members comprises a thin annular base and a plurality of arms which is attached integrally to an outer rim of the annular base in a cantilever state and generates a repelling force by a pressure applied along the optical axis of the lens arranged at the aperture of the subject side, for making the end faces of the lenses elastically contact each other.

In the twelfth aspect of the present invention, the lens assembly as in the fifth aspect is characterized in that the end face support has a stopper on its inner face such that not an edge of a through hole formed on the end face support but the stopper contacts the outer surface of the lens placed on the image side when an external vibration is inputted.

In the thirteenth aspect of the present invention, the lens assembly as in the first aspect is characterized in that: the lenses comprise four lenses retained to be stacked between the end face support and the entire circumference support; provided that those four lenses are disposed as a first lens, a second lens, a third lens, and a fourth lens, from the entire circumference support side to the end face support side, the second lens has larger outer diameter than that of the third lens; on the outer circumferential surface of the third lens, there are formed a first equi-diameter outer circumferential surface on one end on the second lens side thereof and a first sloped outer circumferential surface having a progressively smaller outer diameter from the first equi-diameter outer circumferential surface toward the other end face on the opposite side of the second lens; on the outer circumferential surface of the second lens, there are formed a second equi-diameter outer circumferential surface on one end on the third lens side thereof and the second sloped outer circumferential surface having a progressively larger outer diameter from the second equi-diameter outer circumferential surface toward the other end face on the opposite side of the third lens; and the lens frame comprises a sloped inner peripheral surface for fitting the first sloped outer circumferential surface of the third lens, the first equi-diameter inner peripheral surface for fitting the first equi-diameter outer circumferential surface of the third lens, and the second equi-diameter inner peripheral surface for fitting the second equi-diameter outer circumferential surface of the second lens.

In the fourteenth aspect of the present invention, the lens assembly as in the thirteenth aspect is characterized in that: the first lens has larger outer diameter than that of the second lens, and the fourth lens has smaller diameter than that of the third lens, and an elastic member is arranged between the fourth lens and the lens end face support; between the entire circumference support and the end face support, the first lens, the second lens, the third lens, and the fourth lens are pushed and retained elastically by the elastic members, and the first lens has a recess formed across the entire circumference of the end face edge on the second lens side, and a sealing member is arranged between the recess and the inner peripheral wall surface of the lens frame.

In the fifteenth aspect of the present invention, the lens assembly as in the thirteenth aspect is characterized in that a flare diaphragm is arranged between the second and the third lenses.

According to the first aspect of the present invention, the lens assembly comprises a chamfer formed across the entire circumference of the lens rim on the subject side, and the image side of the lens is supported by the end face support formed on the lens frame, and the subject side of the lens is supported at the chamfer by the entire circumference support formed on the lens frame such that the entire circumference support is continuous with the lens surface at almost the same radius of curvature with the lens surface. Thus, the lens diameter can be reduced, as compared with the case where the lens is supported at a flange attached to a lens, and the outer diameter of the lens frame can also be reduced accordingly, whereby the whole dimension of the lens assembly can be made compact, so that processing of lens can be simplified and subsequently, cost can be reduced. Moreover, the lens is supported by the entire circumference support across its entire circumference on the subject side, so that optical axis shifting is not induced by an outer impact and the lens can be retained with a sufficient retaining strength.

According to the fifth aspect of the present invention, an elastic member is arranged between a diaphragm wall and the image side lens adjacent thereto, such that by applying pressure to the lens disposed at the aperture on the subject side of the lens frame for pushing other lenses along the optical axis, the respective lenses elastically contact each other and are positioned accurately, whereby efficient assembly can be realized.

Moreover, even if an external vibration is inputted to the lens during assembling the lens into the lens frame, the vibration will be absorbed rapidly by the displacement of the elastic member. Further, if the outer vibration is inputted to the lens by an accidental impact on the lens frame, the vibration will be absorbed rapidly by the displacement of the elastic member.

The lens, disposed at the aperture on the subject side of the lens frame, is preferably fixed by means of caulking by heat or mechanical deformation of the lens frame, so that the specific members are not necessary for fixing lenses and the structure can be simplified.

Additionally, the sealing member is provided between the lens disposed at the aperture on the subject side and the lens frame for preventing the introduction of dust and improving waterproof effect, so that stable image acquisition can be realized.

Moreover, by providing the equi-diameter inner circumference faces for arranging the lenses with diameters being progressively smaller toward the diaphragm wall at the inner periphery surface of the lens frame, wrong assembly of the lens can be avoided and the good product quality can be stably maintained.

Furthermore, by disposing the elastic member provided with a plurality of arms, the size of lens assembly can be reduced (i.e., the distance between the first lens and an imaging element can be shortened).

The stopper can be provided on the inner face of the diaphragm wall such that not an edge of a through hole in the diaphragm wall but the stopper contacts the lens placed on the image side when an external vibration is inputted, so that generation of scars within the effective diameter of the lens due to the contact of the rim with the lens can be avoided.

According to the thirteenth aspect of the present invention, the third lens can be smoothly inserted into the lens frame by guiding the first sloped outer circumferential surface of the third lens, through the first sloped inner peripheral surface of the lens frame, and the optical axis of the third lens can be positioned by fitting the first equi-diameter outer circumferential surface of the third lens into the first equi-diameter inner peripheral surface of the lens frame. The second lens can have its optical axis positioned and can be inserted into the lens frame smoothly without affecting the posture of the third lens, by means of fitting the second equi-diameter outer circumferential surface into the second equi-diameter inner peripheral surface of the lens frame. Therefore, the assembling property will be improved and desired optical characteristics can easily be attained. Moreover, sloped outer circumferential surfaces are formed for the third and the second lenses respectively, so that the areas of large diameter of the lens frame can be reduced and whole dimension of the lens assembly can also be made compact, whereas the thickness of the lens frame is maintained.

BRIEF DESCRIPTION OF THE DRAWINGS

FIG. 8 is a perspective exploded view of the lens assembly as shown in FIG. 7.

DESCRIPTION OF THE PREFERRED EMBODIMENTS

Figure 1:
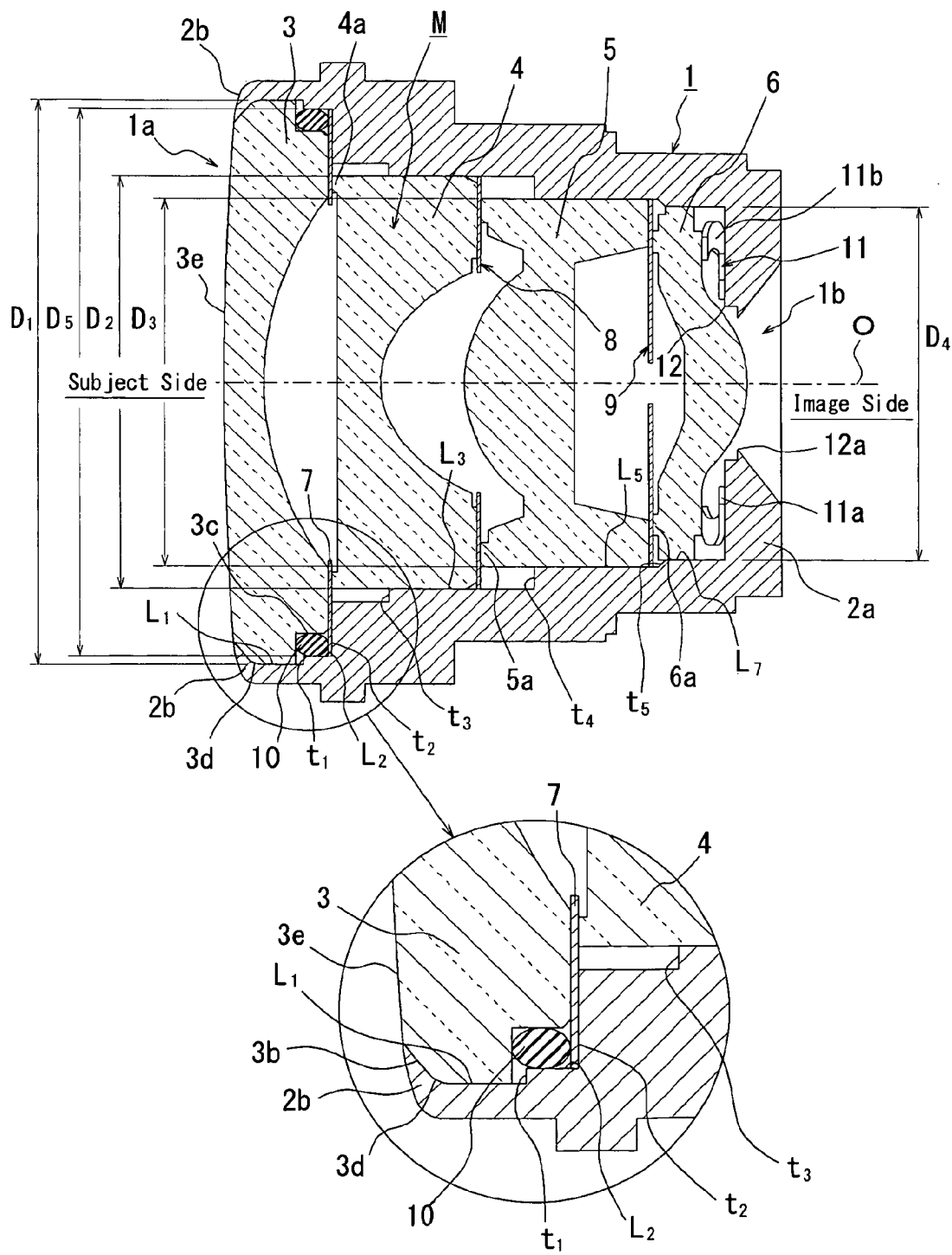
FIG. 1 is a cross sectional view schematically showing a structure of the lens assembly according to an embodiment of the present invention.

In the following section, embodiments of the present invention will be described referring to the drawings.

The First Embodiment

Figure 2:
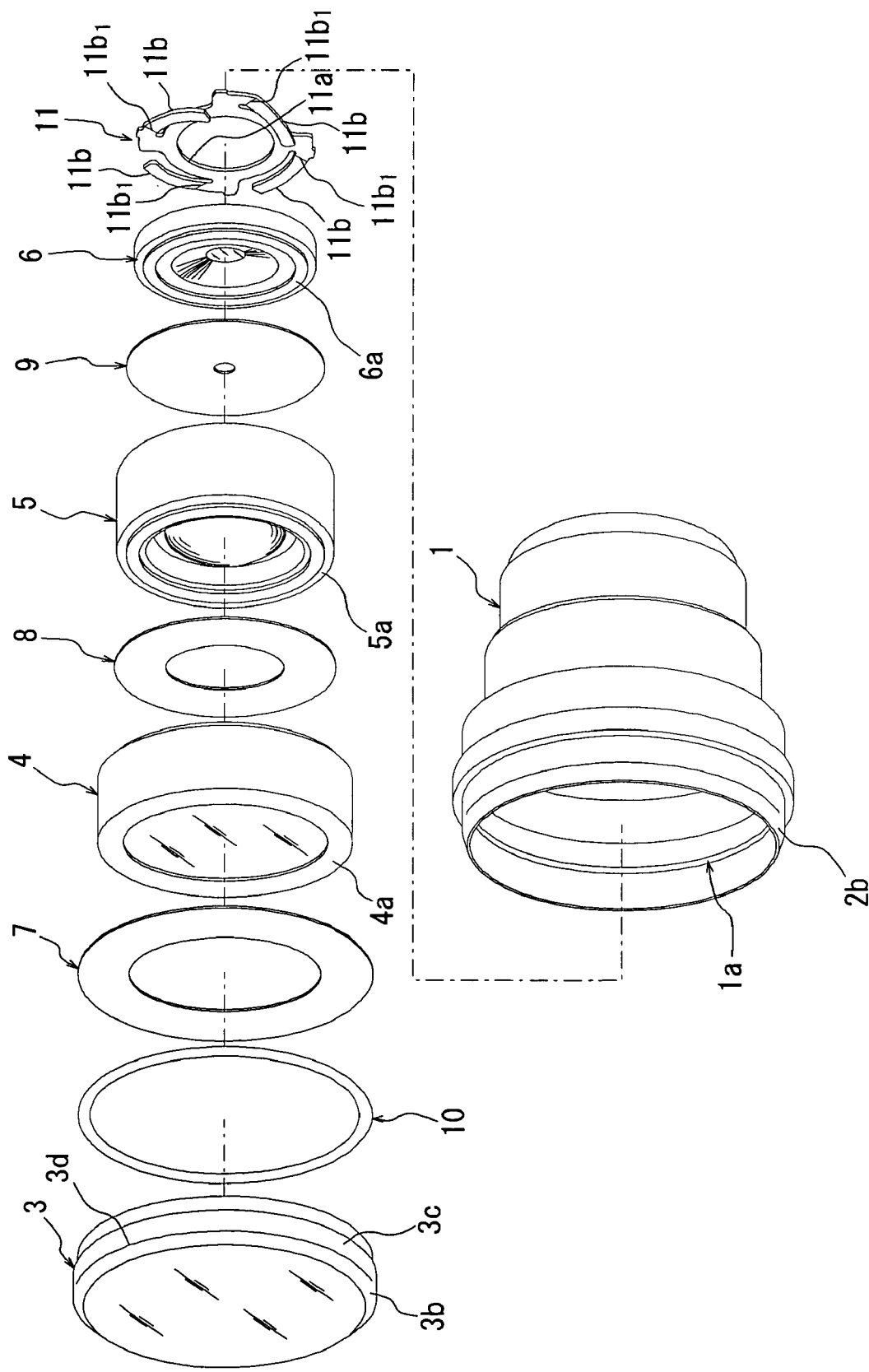
FIG. 2 is an exploded perspective view of the lens assembly as shown in FIG. 1.

FIG. 1 is a cross sectional view schematically illustrating of a lens assembly according to an embodiment of the present invention and FIG. 2 is an exploded perspective view of FIG. 1.

As shown in FIGS. 1 and 2, the lens assembly of the present embodiment retains a lens group M comprising four lenses; the first lens 3, the second lens 4, the third lens 5, and the fourth lens 6, on a lens frame 1 along the optical axis O. In the present description, the side of the first lens 3 will be called the subject side (the left had side in the document sheet) and the side of the fourth lens 6 will be called the image side (the right hand side in the document sheet) hereinafter, for convenience. The subject side and the image side of each lens may respectively be called front side and back side.

The lens frame 1 comprises a circumferential wall of plastics or metal material, and has the subject side aperture 1a and the image side aperture 1b, each opens to both subject and image sides respectively, and the light from the subject enters into the lens frame 1 through the aperture 1a on the subject side and outputted from the image side aperture 1b via the lens group M and subsequently will reach the imaging element (not shown). Steps $t_1$ to $t_5$ are formed at the inner peripheral surface of the lens frame 1, and the inner peripheral wall surfaces (equi-diameter inner peripheral surfaces) $L_1$, $L_3$, $L_5$, and $L_7$, with the diameters $D_1$ to $D_4$ which becomes stepwise smaller toward the image side aperture 1b, are formed by those steps for disposure of the lenses. An inner peripheral wall surface (equi-diameter inner peripheral surfaces) $L_2$ having the diameter $D_5$ ($D_2 < D_5 < D_1$) is formed by the steps $t_1$ and $t_2$.

At the image side edge of the lens frame 1, the edge face support of the lens group M and a diaphragm wall 2a forming the image side aperture 1b are provided. The image side aperture 1b is formed on the diaphragm wall 2a to expose the center part around the optical axis, of the fourth lens 6, positioned on the image side.

The first lens 3 is formed by a concave meniscus lens made of glass and arranged on the equi-diameter inner peripheral surface $L_1$, with its convex surface facing the subject side. The first lens 3 is retained by the lens frame 1, by means of the entire circumference support 2b formed by caulking on the edge of the subject side of the lens frame 1. The outer circumferential surface 3a of the first lens 3 is fitted into the equi-diameter inner peripheral surface $L_1$, and a chamfer 3b is formed across the entire circumference of the rim of the convex surface. Moreover, the chamfer 3b is supported by the entire circumference support 2b by caulking, whereby the subject side aperture 1a is formed by the entire circumference support 2b. As shown in the partial enlarged view of FIG. 1, the entire circumference support 2b supports the chamfer 3b such that the entire circumference support 2b is continuous with the convex surface at almost the same radius of curvature with the convex surface. The side corner 3d of the outer circumferential surface of the chamfer 3b is corner-rounded. Additionally, an incidence plane 3e of the first lens 3 is coated with water repellent material described in, for example, JP2007-63118A.

The second lens 4 is formed by the plano-concave lens made of plastics, and arranged on the image side of the first lens 3 in the equi-diameter inner circumferential surface $L_3$. A contact 4a, which is in surface contact with the back face of the first lens 3 through a flare diaphragm 7, is formed in the front surface of the second lens 4.

The third lens 5 is a plano-convex lens made of plastics, and arranged on the image side of the second lens 4 on the equi-diameter inner peripheral surface $L_5$. A contact 5a, which is in surface contact with the back face of the second lens 4 through a flare diaphragm 8, is formed on the front surface of the third lens 5, in the same way as the second lens 4.

The fourth lens 6 is a convex meniscus lens made of plastics, and arranged on the image side of the third lens 5 on the equi-diameter inner peripheral surface $L_7$, with its convex surface facing the image side. A contact 6a, which is in surface contact with the back face of the third lens 5 through a flare diaphragm 9, is formed on the front surface of the fourth lens 6, in the same way as the third lens 5. The fourth lens 6 is arranged to make its center part of the convex surface on the image side protrude from the image side aperture 1b formed by the flare diaphragm 2. The second lens 4, the third lens 5, and the fourth lens 6 can be each provided with one or more cutting surface on its outer circumferential surface.

The flare diaphragm 7 is arranged between the first lens 3 and the second lens 4, and the flare diaphragm 8 is arranged between the second lens 4 and the third lens 5, and the aperture diaphragm 9 is arranged between the third lens 5 and the fourth lens 6. The flare diaphragms 7 and 8 are to avoid transmission of a disturbing light, which does not contribute to photographing and etc., and made of sheet members such as polyester sheets, of which surface is subjected to matting by, for example a black coating, so as to avoid reflection. The aperture diaphragm 9 controls the brightness by limiting the diameter of an axial light flux transmitting the lens group M, and similar to the flare diaphragm 7 and 8, it comprises sheet members such as polyester sheets, and its surface is subjected to matting by, for example, a black coating, so as to avoid reflection. The flare diaphragm 7 and 8 and the aperture diaphragm 9 may be structured by, for example, subjecting the rim of each lens directly to black coating or matting.

The first lens 3 comprises a recess 3c across the entire circumference of its rear edge portion, and a sealing member 10, for example, an O-ring, can be clumped between the recess 3c and the equi-diameter inner peripheral surface $L_2$ formed by steps $t_1$ and $t_2$ of the lens frame 1, so that the air tightness can be maintained between thereof.

An elastic member 11 formed by leaf springs is arranged between the fourth lens 6 and the diaphragm wall 2a. The elastic member 11 positions the respective lenses 3, 4, 5, and 6 along the optical axis within the lens frame 1 by making the end faces of the respective lenses 3, 4, 5, 6 elastically contact with (or support) each other by way of the flare diaphragms 7, 8, 9 by a repelling power, which is generated by pushing the first lens 3 into the equi-diameter inner peripheral surface $L_1$ for disposing the first lend thereat.

Figure 3:
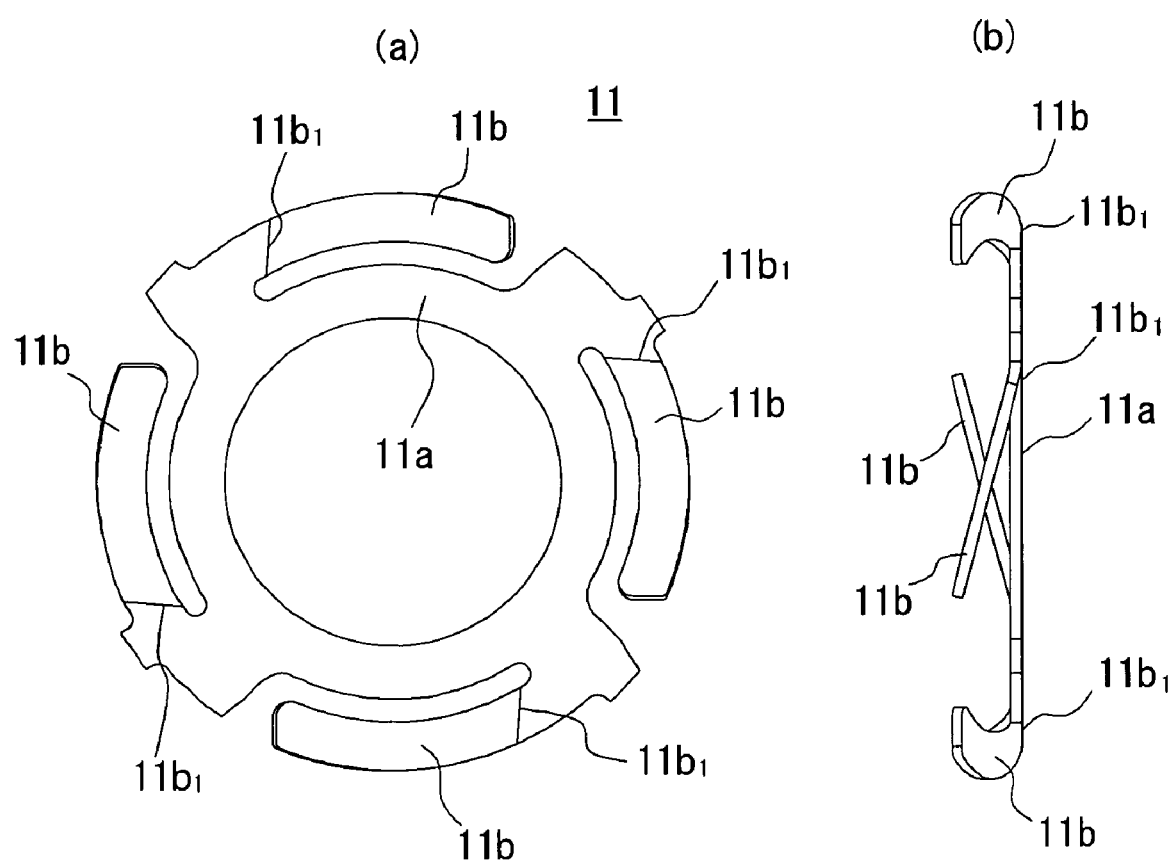
FIG. 3(a) is a front view and FIG. 3(b) is a side view of an elastic member.
Figure 4:
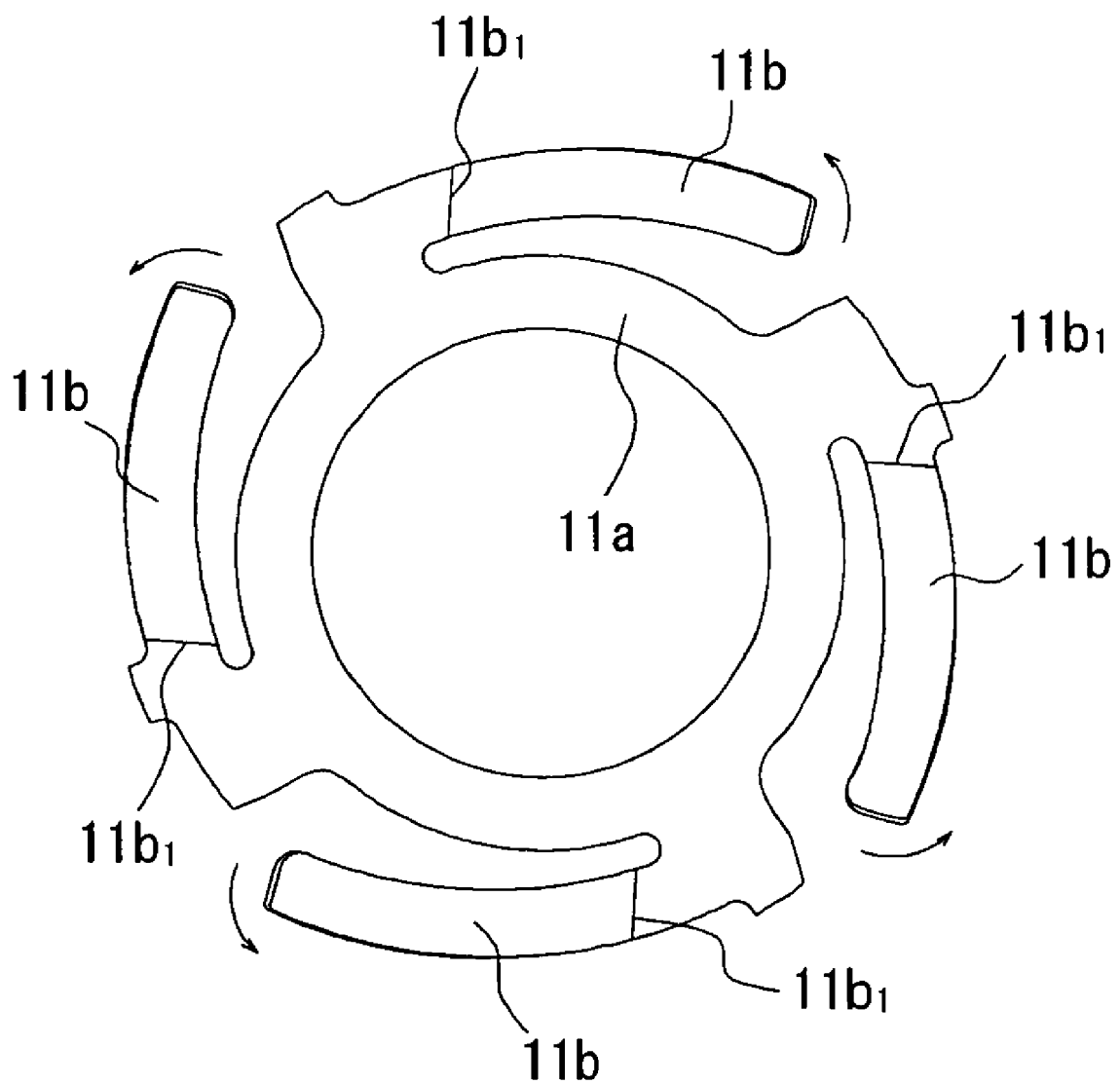
FIG. 4 is an explanatory drawing showing the displacement of the elastic member.

FIGS. 3(a) and 3(b) are a front view and a side view of the elastic member 11, respectively. The elastic member 11 comprises a thin annular base 11a which is provided with an aperture larger than that of the image side aperture 1b formed on the diaphragm wall 2a and allows light to pass through the central region of the fourth lens; and a plurality of arms (plate shaped) 11b which is integrally attached to the outer rim of the annular base 11a in a cantilever state. Each arm 11b is bent in the thickness direction toward a root portion thereof to work as an elastic section and restrain the tip edge thereof to spread outward in the radial direction when a repelling power is generated at the arm 11b.

At the inner side surface of the diaphragm 2, a stopper 12 is provided near the image side aperture 1b. The region outer side in the radial (diametrical) direction than the effective region corresponding to the image side aperture 1b of the fourth lens 6 is brought into contact with, not the aperture edge 12a defining the image side aperture 1b but the stopper 12, when an external stress such as an impact is applied to the lens assembly, whereby the effective region of the fourth lens 6 is prevented from being damaged. The stopper 12 can be an annular projection or a plurality of protrusions spaced apart each other.

In the followings, an example of the lens assembly procedure according to the present invention will be described.

First of all, in a state where the lens frame 1 comprising the image side aperture 1b and the stopper 12 formed on its diaphragm wall 2a is placed such that its subject side aperture faces upward, the elastic member 11, the fourth lens 6, the diaphragm 9, the third lens 5, the flare diaphragm 8, the second lens 4, and the flare diaphragm 7 are sequentially inserted (dropped) to be stacked, from the subject side aperture. Next, the first lens 3 is pushed into the lens frame 1 together with the sealing member 10, against the elastic power of the elastic member 11, to be stacked upon the flare diaphragm 7. Then, the subject side edge of the lens frame 1 is subjected to heat or mechanical deformation by caulking so as to support the chamfer 3b formed on front side of the first lens 3 across the entire circumference by the entire circumference support 2b such that the circumference support 2b is continuous with the lens surface at almost the same radius of curvature of the front convex face of the lens, whereby the entire circumference support 2b forms the subject side aperture 1a.

Therefore, the lenses 3, 4, 5 and 6, and diaphragms 7, 8 and 9 are respectively positioned and retained along the optical axis, by elastically pushing the end faces of the respective lens 3, 4, 5, 6 with each other via the diaphragm 7, 8 and 9 between the entire circumference 2b and the diaphragm wall 2a of the lens frame 1, that is, between the subject side aperture 1a and the image side aperture 1b, by the elastic power of the elastic member 11.

In the lens assembly according to the present embodiment, a chamfer 3b is formed on the front surface rim of the first lens 3 facing subject side, and the chamfer 3b is supported by the entire circumference support 2b of the lens frame 1 such that the entire circumference support 2b is continuous with the lens surface at almost the same radius of curvature as the front surface of the lens, whereby the diameter of the first lens 3 can be reduced, as compared with the case where the lens is supported at a flange attached to the lens, the outer diameter of the lens frame 1 can be reduced accordingly and thus the whole dimension of the lens assembly can be made compact, so that processing of the first lens 3 can be simplified and subsequently cost can be reduced. Moreover, the first lens 3 is supported at the entire circumference of the chamfer 3b thereof by the entire circumference support 2b, whereby optical axis shifting is not induced by an external impact and the lens can be retained stably with a sufficient retaining strength.

The chamfer 3b is formed by rounding the side corner 3d of the outer circumferential surface, whereby stress applied on the first lens 3: during formation of the entire circumference support 2b by caulking; in a state where the first lens 3 is retained inside the lens frame 1; or when an external stress is applied, can be dissipated. As a result, deterioration of the optical performance due to distortion can be prevented.

The first lens 3 facing the subject side is a glass lens, and other lenses 4, 5 and 6 are plastic lenses, and the fourth lens 6 on the image side is supported on the inner surface of the diaphragm wall 2a, which forms the end face support, so that damages on the lenses retained in the lens assembly can be reliably avoided, the lens assembly weight can be reduced, distortion of the first lens 3 is less likely to happen and thus deterioration of the optical performance can be more reliably avoided. Moreover, the aperture diaphragm 9 is placed between the third lens 5 and the fourth lens 6, so that diameters of the lenses can be reduced and those lenses can become progressively smaller form the first lens 3 to the fourth lens 6. Therefore, the inner shape of the lens frame 1 is adopted such that the lenses can be dropped thereinto in the order of the fourth lens 6, the third lens 5, the second lens 4, and the first lens 3, sequentially, whereby it is possible to improve assembly property and reduce in size and weight of the lens assembly.

The sealing member 10 is placed between the first lens 3 and the equi-diameter inner peripheral surface $L_2$ inside the lens frame 1, so as to effectively prevent intrusion of dust from the subject side into the lens frame 1 and attain a good waterproof effect. Thus, when the lens assembly is mounted on monitoring camera as a photography lens assembly, for example, the lens assembly can be stably used in a long term. Moreover, the flare diaphragms 7 and 8 are respectively disposed between the first lens 3 and the second lens 4, and between the second lens 4 and the third lens 5, so that flare can be reliably prevented from occurring. Further, the elastic member 11, which pushes the fourth lens 6 elastically toward the first lens 3, is disposed between the fourth lens 6 and the diaphragm wall 2a, which forms the lens end face support, so that the end faces of the lenses 3, 4, 5 and 6 push each other elastically via the diaphragms 7, 8, and 9, respectively and those lenses can be positioned along the optical axis and retained thereto.

The Second Embodiment

Figure 5:
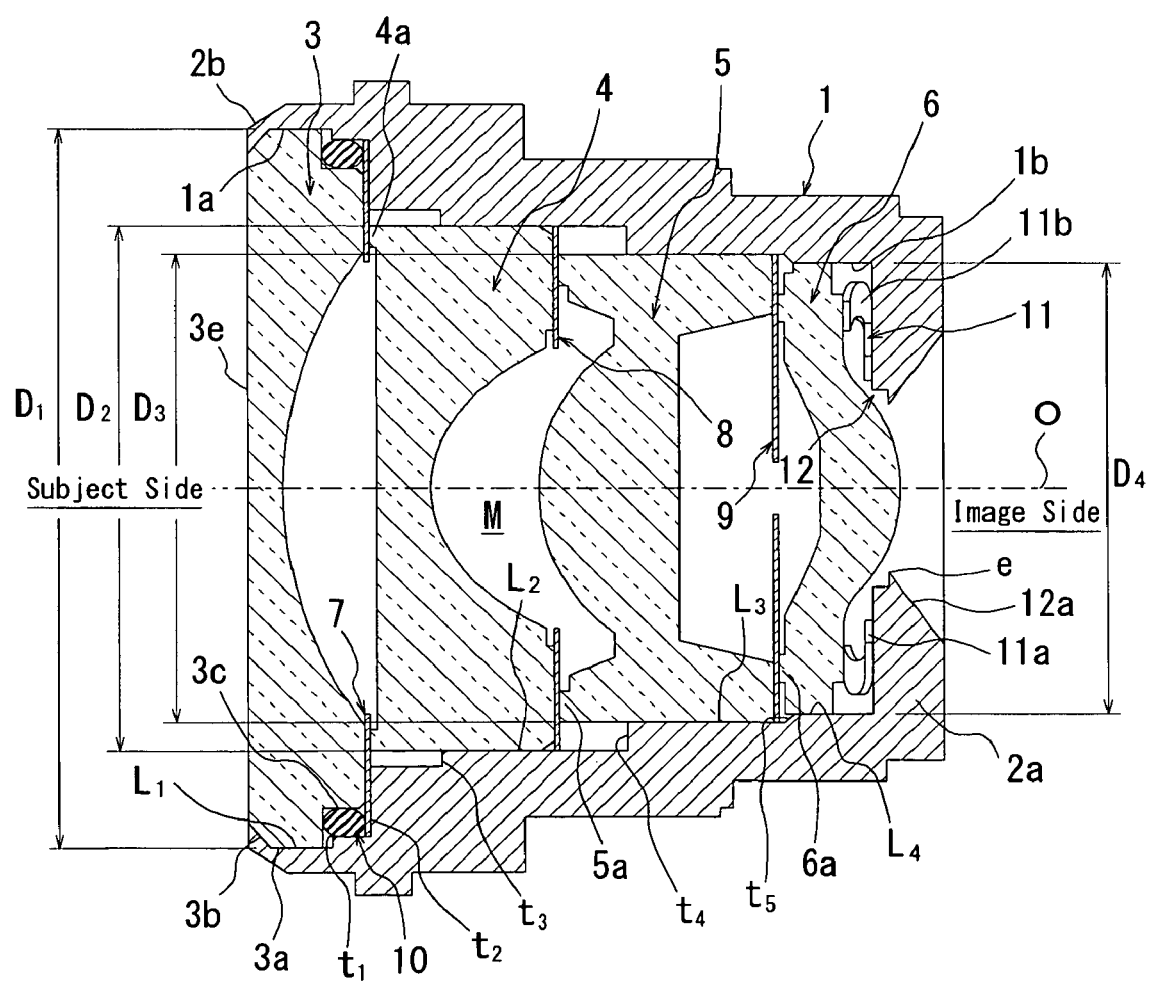
FIG. 5 is a cross sectional view of the lens assembly according to a second embodiment of the present invention.
Figure 6:
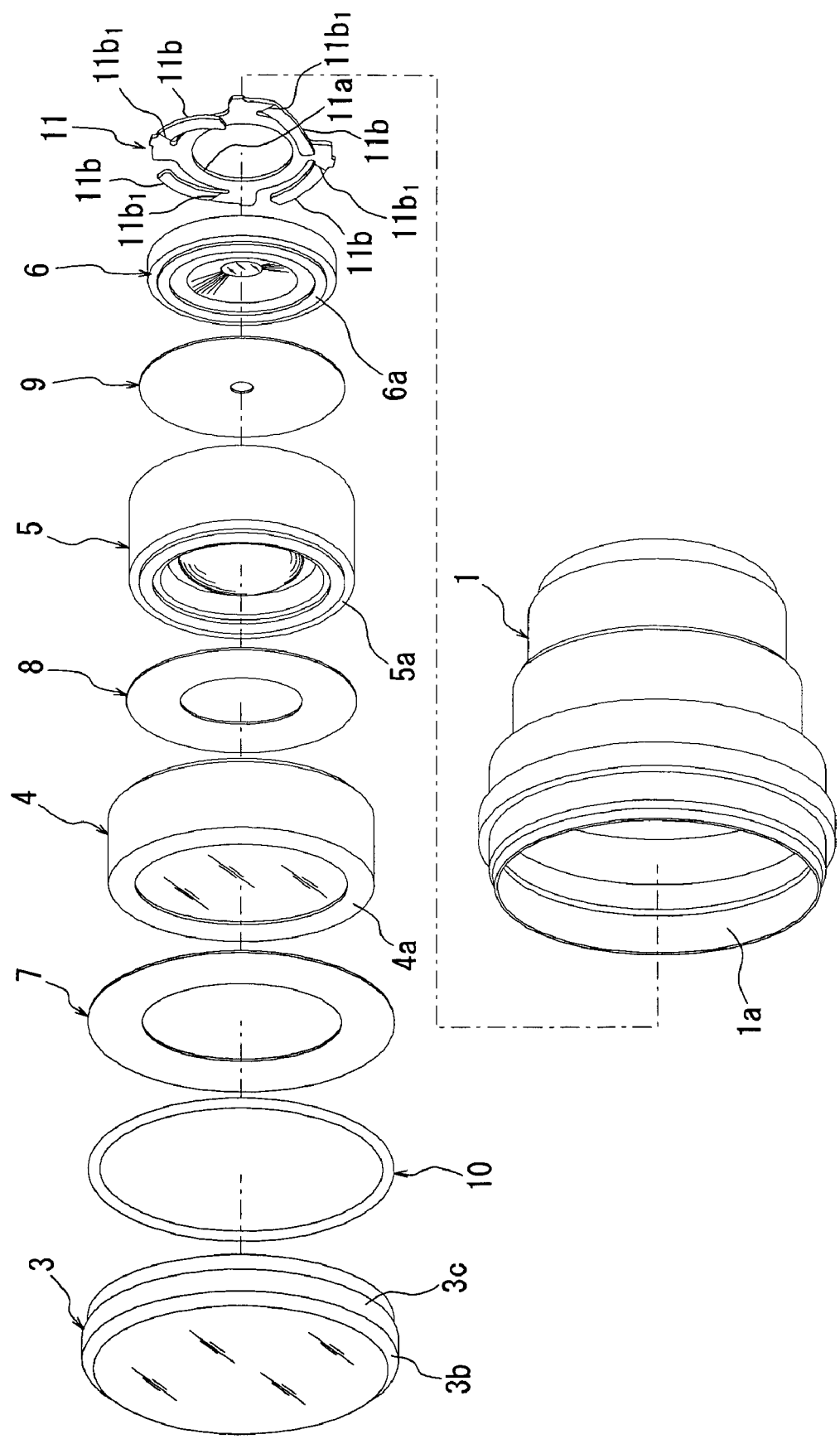
FIG. 6 is an appearance perspective view showing an exploded state of the lens assembly as shown in FIG. 5.

FIG. 5 is a cross sectional view schematically showing the lens assembly according to a second embodiment of the present invention, and FIG. 6 is an appearance perspective view showing an exploded state of the lens assembly as shown in FIG. 5

As shown in FIGS. 5 and 6, the lens assembly 1 according to the present embodiment is substantially the same as the lens assembly according to the first embodiment, except that the curvature of the lens face on the subject side of the first lens 3 is infinite, i.e. the lens face is flat, and the first lens 3 is supported at the chamfer 3b formed at the flat lens surface thereof by the entire circumference support 2b such that the entire circumference support 2b is continuous with the flat lens surface.

When the lens surface is flat, the chamfer is formed in the lens at an angle of approximately 45 degrees with respect to the flat lens surface, in a manner similar to the normal chamfering process, so as to support the chamfer by the entire circumferential support in approximately the same thickness as that of the lens frame on the side of circumferential surface.

The side corner 3d of the outer circumferential surface of the chamfer 3b is different from that of the first embodiment, in that the former is not corner-rounded. Since other configurations are similar to those of the first embodiment, hence, similar components will be referred to with the same reference numbers and detailed descriptions thereof will be omitted.

According to the present embodiment, similar to the first embodiment, an elastic member is placed between the diaphragm wall 2a and the fourth lens 6, whereby, during assembly of the lens assembly, the elastic member 11 is first inserted into the lens frame 1 and then, the fourth lens 6, diaphragm 9, the third lens 5, the diaphragm 8, the second lens 4 and the diaphragm 7 are subsequently placed therein. Then, the first lens 3, together with the sealing member 10, is pushed into the aperture 1a on the subject side of the lens frame 1 and subsequently the first lens 3 is fixed to the equi-diameter inner peripheral surface $L_1$ by caulking of the lens frame 1. At this time, a repelling power is generated in the elastic member 11 and thus the respective end faces of the second lens 4, the third lens 5, and the fourth lens 6 elastically contact each other by the first lens 3, whereby the respective lenses will be positioned accurately along the optical axis O in the lens frame 1, without requiring any unnecessary operations.

The Third Embodiment

Figure 7:
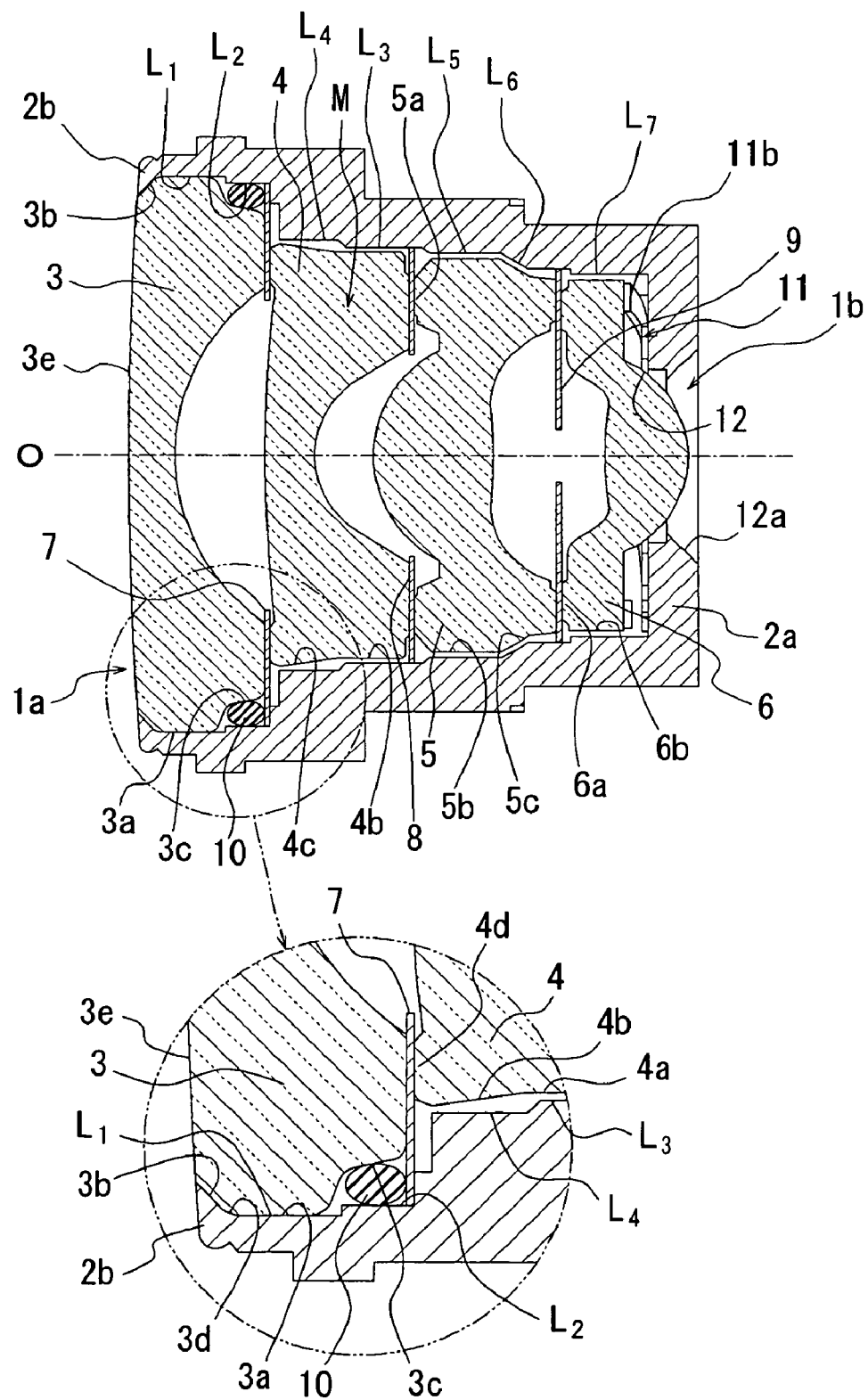
FIG. 7 is a cross sectional view schematically showing of a structure of the lens assembly according to a third embodiment of the present invention.

FIG. 7 is a cross sectional view schematically showing a structure of the lens assembly according to a third embodiment of the present invention, and FIG. 8 is an exploded perspective view thereof.

As shown in FIGS. 7 and 8, the lens assembly of the present embodiment comprises a lens group M, the lens frame 1, the first lens 3, the flare diaphragms 7 and 8, the aperture diaphragm 9, and the elastic member 11, which are configured similarly to those in the first embodiment.

The lens assembly of the present embodiment is basically the same as the lens assembly 1 of the first embodiment, except that the shapes of the outer circumferential surfaces of the second lens 4 and the third lens 5 and the shape of the inner peripheral portion of the lens frame 1 contacting thereto have bee modified.

Because of this, in the present embodiment, the second lens 4 is formed by the concave meniscus lens made of plastics, the equi-diameter outer circumferential surface (the second equi-diameter outer circumferential surface) 4b is formed on the edge, on the concave surface side, of the outer circumferential surface of the second lens 4, and a sloped outer circumferential surface (the second sloped outer circumferential surface) 4c having progressively larger diameters is formed from the equi-diameter outer circumferential surface 4b to the convex surface side. The second lens 4 is positioned such that its convex surface faces the subject side and the equi-diameter outer circumferential surface 4b is fitted into the equi-diameter inner peripheral surface (the second equi-diameter inner peripheral surface) $L_3$ formed in the lens frame 1, and the sloped outer circumferential surface 4c is arranged at the equi-diameter inner peripheral surface $L_4$ formed in the lens frame 1. The diameter of the equi-diameter inner peripheral surface $L_3$ is smaller than that of the equi-diameter inner peripheral surface $L_4$. A contact 4d, which is in surface contact with the back face of the first lens 3 through the flare diaphragm 7, is formed in the front surface of the second lens 4.

The third lens 5 is formed of the convex meniscus lens made of plastics and has a flange, and the equi-diameter outer circumferential surface (the first equi-diameter outer circumferential surface) 5b is formed at the edge portion on the convex face side having a relatively small curvature, on the outer periphery of the flange. Further, a sloped outer circumferential surface (the first sloped outer circumferential surface) 5c having progressively small diameters from the equi-diameter outer circumferential surface 5b to the convex surface side having a relatively large radius of curvature is formed on the outer periphery of the flange. The third lens 5 is positioned such that its convex surface having relatively small curvature faces the subject side, and the equi-diameter outer circumferential surface 5b is fitted into the equi-diameter inner peripheral surface (the first equi-diameter inner peripheral surface) $L_5$ formed in the lens frame 1, and the sloped outer circumferential surface 5c is fitted into the sloped inner peripheral surface $L_6$ formed in the lens frame 1. The sloped inner peripheral surface $L_6$ is formed to have progressively smaller diameters from the equi-diameter inner peripheral surface $L_5$ to the image side. Similar to the second lens 4, a contact 5d, which is in surface contact with the back face of the second lens 4 through the flare diaphragm 8, is formed in the front surface of the flange of the third lens 5.

Since other configuration are similar to those of the first embodiment, similar components will be referred to with the same reference numbers and detailed descriptions thereof will be omitted.

Hereinbelow, an example of the lens assembly procedure according to the present embodiment will be described.

First, in a state where the lens frame 1 comprising the image side aperture 1b and the stopper 12 formed on its diaphragm wall 2a is placed such that its subject side aperture faces upward, the elastic member 11, the fourth lens 6, the diaphragm 9, the third lens 5, the flare diaphragm 8, the second lens 4, and the flare diaphragm 7 are inserted (dropped) to be stacked, sequentially from the subject side aperture. Next, the first lens 3, together with the sealing member 10, is pushed into the lens frame 1, against the elastic power of the elastic member 11, such that the first lens 3 and the seal member 10 are stacked upon the flare diaphragm 7. In that state, the subject side edge of the lens frame 1 is subjected to heat or mechanical deformation by caulking so as to support the chamfer 3b formed on front side of the first lens 3, across the entire circumference, by the entire circumference support 2b such that the circumference support 2b is continuous with the lens surface at almost the same radius of curvature of the front convex face of the lens, whereby the entire circumference support 2b forms the subject side aperture 1a.

Therefore, the lenses 3, 4, 5 and 6, and diaphragms 7, 8 and 9 are respectively positioned and retained along an optical axis, by elastically pushing the end faces of the respective lenses 3, 4, 5, 6 each other via the diaphragm 7, 8 and 9 between the entire circumference support 2b and the diaphragm wall 2a of the lens frame 1, that is, between the subject side aperture 1a and the image side aperture 1b, by the elastic power of the elastic member 11.

As mentioned above, in the lens assembly according to the present embodiment, the outer circumferential surface of the flange of the third lens 5 is constituted of an equi-diameter outer circumferential surface 5b on the second lens 4 side and a sloped outer circumferential surface 5c on the fourth lens 6 side, having progressively smaller diameters from the equi-diameter outer circumferential surface 5b. At the region of the lens frame 1 retaining the third lens 5, the sloped inner peripheral surface $L_6$ to which the sloped outer circumferential surface 5c is fitted and the sloped inner peripheral surface $L_5$ to which the equi-diameter outer circumferential surface are fitted are formed in accordance with the shape of the circumferential face of the third lens 5. Therefore, in assembly of the lens, the third lens 5 can be smoothly inserted into the lens frame 1 from the side of the sloped outer circumferential surface 5c, because the sloped outer circumferential surface 5c is guided by the sloped inner peripheral surface $L_6$ of the lens frame 1. Moreover, the optical axis of the third lens 5 can be positioned in place due to the first equi-diameter outer circumferential surface 5b of the third lens 5 fitting to the first equi-diameter inner peripheral surface $L_5$ of the lens frame 1.

The outer circumferential surface of the second lens 4 which is larger than third lens 5 and inserted thereafter has the equi-diameter outer circumferential surface 4b in the region near the third lens 5 and the sloped outer circumferential surface 4c with progressively larger diameters from the equi-diameter outer circumference 4b in the region near the fourth lens. At the region of the lens frame 1 retaining the second lens 4, the equi-diameter inner peripheral surface $L_3$ is formed such that the equi-diameter outer circumference surface 4b is fitted thereto. Therefore, when the second lens 4 is inserted into the lens frame 1 from the side of the equi-diameter outer circumferential surface 4b, the equi-diameter circumference 4b is fitted in the equi-diameter inner peripheral surface $L_3$ of the lens frame 1, whereby the optical axis of the second lens 4 is positioned in place and the second lens 4 can be smoothly inserted without affecting the posture of the third lens 5, which has been inserted already.

Therefore, lens assembling property will be improved and desired optical characteristics can easily be attained. Moreover, the sloped outer circumferential surface 5c is formed on the third lens 5 and the sloped outer circumferential surface 4c is formed on the second lens 4, so that the areas of large diameters of the lens frame can be reduced and whole dimension of the lens assembly can be made compact, whereas the thickness of the lens frame is maintained, compared with a case in which no sloped outer circumferential surface as described above is formed and the entire part of the outer circumferential surface of the third lens 5 is designed to be an equi-diameter outer circumferential surface having the same outer diameter as that of the equi-diameter outer circumferential surface 5b and the entire part of the outer circumferential surface of the second lens 4 is designed to be an equi-diameter outer circumferential surface having the same outer diameter as the maximum outer diameter of the sloped outer circumferential surface 4c.

Further, sealing member 10 is placed between the recess 3c of the first lens 3 and the equi-diameter inner peripheral surface $L_2$ of the lens frame 1, so as to effectively prevent intrusion of the dust into the lens frame 1 from the subject side and attain a good waterproof effect. Thus, when the lens assembly is mounted on a monitoring camera or the like, for example, as a shooting lens assembly, long term, stable durability can be ensured. The elastic member 11, which pushes the fourth lens 6 elastically toward the first lens 3, is disposed between the fourth lens 6 and the diaphragm wall 2a forming lens edge face support, so that the end faces of the respective lenses 3, 4, 5 and 6 are pushed elastically with respect to each other via the diaphragms 7, 8, and 9 by the resilient force and those lenses can be positioned along the optical axis and retained in place. Moreover, flare diaphragm 7 and 8 are respectively disposed between the first lens 3 and the second lens 4, and between the second lens 4 and the third lens 5, respectively, whereby occurrence of flare can be reliably prevented.

According to the lens assembly of the present embodiment, a chamfer 3b is formed at a rim of the lens surface on the front side of the first lens 3 facing the subject side and the chamfer 3b is supported by the entire circumference support 2b of the lens frame 1 such that the entire circumference support 2b is continuous with the lens surface on the front side at substantially the same radius of curvature as that of the front surface of the lens, whereby the diameter of the first lens 3 can be reduced, as compared with the case where the lens is supported at a flange formed on the lens, and the outer diameter of the lens frame 1 can also be reduced accordingly, so that the whole dimension of the lens assembly can be made compact, processing of the first lens 3 is simplified and manufacturing cost can be reduced. Moreover, the first lens 3 is supported at the entire circumference of the chamfer 3b by the entire circumference support 2b, so that optical axis shifting is not induced by an external impact and the lens can be stably retained with a sufficient retaining strength.

The chamfer 3b is formed by rounding the side corner 3d of the outer circumferential surface, whereby stress applied on the first lens 3: during formation of the entire circumference support 2b by caulking; in a state where the first lens 3 is retained inside the lens frame 1; or when an external stress is applied, can be dissipated. As a result, deterioration of the optical performance due to distortion can be prevented.

The first lens 3 facing the subject side is a glass lens, and other lenses 4, 5 and 6 are plastic lenses, and the fourth lens 6 on the image side is supported on the inner surface of the diaphragm wall 2a, which forms the end face support, so that damages on the lenses retained in the lens assembly can be reliably avoided, the lens assembly weight can be reduced, distortion of the first lens 3 is less likely to happen and thus deterioration of the optical performance can be more reliably avoided. Moreover, the aperture diaphragm 9 is placed between the third lens 5 and the fourth lens 6, so that diameters of the lenses can be reduced and those lenses can become progressively smaller form the first lens 3 to the fourth lens 6. Therefore, the inner shape of the lens frame 1 is adopted such that the lenses can be dropped thereinto in the order of the fourth lens 6, the third lens 5, the second lens 4, and the first lens 3, sequentially, whereby it is possible to improve assembly property and reduce in size and weight of the lens assembly.

The present invention is not limited to the above mentioned embodiments, and various changes and modifications can be applied. For example the lens group M retained inside the lens assembly is not limited to a lens group comprising four lenses and the present invention can be effectively applied to a lens group comprising, for example, desired number of lenses or a single lens. The curvature of the lens supported by the entire circumference support can be set at any desirable value, as long as the chamfer formed on the lens surface is supported such that the portion supported by the entire circumference support exhibits substantially the same curvature as that of the lens surface.

For example, in the case where the chamfer is formed on a convex lens surface, the lens is chamfered deeper toward the rear face thereof for the smaller radius of curvature, so that an entire circumference support at the chamfer preferably has substantially the same thickness as the lens frame surrounding the lens circumferential surfaces, for ensuring a retaining strength.

The elastic member 11 may be modified to have any shape and/or replaced with a rubber member in stead of a leaf spring. Alternatively, the elastic member 11 may be omitted.

The invention claimed is:

1. A lens assembly including lenses and a lens frame for retaining the lenses, the frame having apertures respectively open to a subject side and an image side, wherein:

the lens frame comprises an entire circumference support for supporting a lens rim on the subject side across the entire circumference thereof, and an end face support for supporting the image side of the lenses;

each of the lenses having a chamfer formed across the entire circumference of the lens rim on the subject side;

the entire circumference support supports the chamfer such that the entire circumference support is continuous with the lens surface at substantially the same radius of curvature as the lens surface; and the chamfer is formed by rounding a side corner of an outer circumferential surface.

2. The lens assembly according to claim 1, wherein:

the lenses comprise four lenses retained to be stacked with each other between the end face support and the entire circumference support; and provided that those four lenses are disposed as a first lens, a second lens, a third lens, and a fourth lens from the entire circumference support side to the end face support side, the first lens is made of glass and the second, the third, and the fourth lenses are made of plastics, respectively, and a chamfer is formed on a lens face on the opposite side of the end face support, of the first lens, and an aperture diaphragm is formed between the third and the fourth lenses.

3. The lens assembly according to claim 2, wherein:

the first lens has a recess formed across the entire circumference of the end face edge portion on the end face support side;

the inner periphery of the lens frame has an inner peripheral wall surface, which is opposite to the recess;

a sealing member is arranged between the recess and the inner peripheral wall surface;

flare diaphragms are arranged between the first and the second lenses, and between the second and the third lenses, respectively; and an elastic member is arranged between the fourth lens and the end face support for elastically pushing the fourth lens toward the first lens.

4. The lens assembly according to claim 1, wherein:

the lenses comprise a plurality of lenses arranged in an order along the optical axis in the lens frame;

the end face support is formed on the end face of the aperture on the image side of the lens frame, as a diaphragm wall, which is attached to the end face integrally for exposing only an optically functioning portion of a lens positioned on the image side; and an elastic member is arranged between the end face support and the lens on the image side, for positioning the end faces of the lenses by means of making these end faces elastically contact each other by using a pressure along the optical axis of the lens, which lens is fixed on the aperture on the subject side.

5. The lens assembly according to claim 4, wherein the lenses comprise at least three lenses which have diaphragms between end faces thereof.

6. The lens assembly according to claim 4, wherein the entire circumference support fixes a lens placed at the aperture on the subject side by means of caulking made by heat or mechanical deformation of the lens frame.

7. The lens assembly according to claim 4, wherein the lens, which is arranged at the aperture on the subject side, is clamped between the end face of the lens and a step inside the lens frame, and the lens assembly further comprising a sealing members for keeping a space between the end face of the lens and a step inside the lens frame gas-tight.

8. The lens assembly according to claim 4, wherein the lens arranged at the aperture on the subject side is a lens made of glass, and other lenses including the lens on the image side are lenses made of plastics.

9. The lens assembly according to claim 4, wherein the lens frame comprises inner peripheral wall surface for arranging lenses having progressively smaller diameters toward the end face support.

10. The lens assembly according to claim 4, wherein the elastic members comprises a thin annular base and a plurality of arms which is attached integrally to an outer rim of the annular base in a cantilever state and generates a repelling force by a pressure applied along the optical axis of the lens arranged at the aperture of the subject side, for making the end faces of the lenses elastically contact each other.

11. The lens assembly according to claim 4, wherein the end face support has a stopper on its inner face such that not an edge of a through hole formed on the end face support but the stopper contacts the outer surface of the lens placed on the image side when an external vibration is inputted.

12. The lens assembly according to claim 1, wherein:
the lenses comprise four lenses retained to be stacked between the end face support and the entire circumference support;
provided that those four lenses are disposed as a first lens, a second lens, a third lens, and a fourth lens, from the entire circumference support side to the end face support side, the second lens has larger outer diameter than that of the third lens;
on the outer circumferential surface of the third lens, there are formed a first equi-diameter outer circumferential surface on one end on the second lens side thereof and a first sloped outer circumferential surface having a progressively smaller outer diameter from the first equi-diameter outer circumferential surface toward the other end face on the opposite side of the second lens;
on the outer circumferential surface of the second lens, there are formed a second equi-diameter outer circumferential surface on one end on the third lens side thereof and the second sloped outer circumferential surface having a progressively larger outer diameter from the second equi-diameter outer circumferential surface toward the other end face on the opposite side of the third lens; and
the lens frame comprises a sloped inner peripheral surface for fitting the first sloped outer circumferential surface of the third lens, the first equi-diameter inner peripheral surface for fitting the first equi-diameter outer circumferential surface of the third lens, and the second equi-diameter inner peripheral surface for fitting the second equi-diameter outer circumferential surface of the second lens.

13. The lens assembly according to claim 12, wherein:
the first lens has larger outer diameter than that of the second lens, and the fourth lens has smaller diameter than that of the third lens, and an elastic member is arranged between the fourth lens and the lens end face support; and
between the entire circumference support and the end face support, the first lens, the second lens, the third lens, and the fourth lens are pushed and retained elastically by the elastic members, and the first lens has a recess formed across the entire circumference of the end face edge on the second lens side, and a sealing member is arranged between the recess and the inner peripheral wall surface of the lens frame.

14. The lens assembly according to claim 12, wherein a flare diaphragm is arranged between the second and the third lenses.

* * * * *